No. 815,643. PATENTED MAR. 20, 1906.
E. R. SHAW.
IMPLEMENT FOR CUTTING LEATHER AND THE LIKE.
APPLICATION FILED JAN. 9, 1905.

Witnesses:
J. Henry Parker
William A. Copeland

Inventor:
Edward R. Shaw
by MacLeod, Calver, Cushman & ike
Attorneys.

No. 815,643. PATENTED MAR. 20, 1906.
E. R. SHAW.
IMPLEMENT FOR CUTTING LEATHER AND THE LIKE.
APPLICATION FILED JAN. 9, 1905.

Witnesses:
J. Henry Parker
Alice H. Morrison

Inventor:
Edward R. Shaw
by Macleod, Calver, Cushman & Dix
Attorneys.

No. 815,643. PATENTED MAR. 20, 1906.
E. R. SHAW.
IMPLEMENT FOR CUTTING LEATHER AND THE LIKE.
APPLICATION FILED JAN. 9, 1905.

Witnesses:
J. Henry Parker
Alice H. Morrison

Inventor:
Edward R. Shaw
by Macleod, Calver, Cushman & Bick
Attorneys.

No. 815,643. PATENTED MAR. 20, 1906.
E. R. SHAW.
IMPLEMENT FOR CUTTING LEATHER AND THE LIKE.
APPLICATION FILED JAN. 9, 1905.

Witnesses:
J. Henry Parker
Alice H. Morrison

Inventor:
Edward R. Shaw
by Macleod, Calver, Cushman & Dike
Attorneys.

No. 815,643. PATENTED MAR. 20, 1906.
E. R. SHAW.
IMPLEMENT FOR CUTTING LEATHER AND THE LIKE.
APPLICATION FILED JAN. 9, 1905.

Witnesses:
J. Henry Parker
William A. Copeland

Inventor:
Edward R. Shaw
by Macleod, Calver, Cushman & Dike.
Attorneys.

UNITED STATES PATENT OFFICE.

EDWARD R. SHAW, OF LYNN, MASSACHUSETTS.

IMPLEMENT FOR CUTTING LEATHER AND THE LIKE.

No. 815,643.  Specification of Letters Patent.  Patented March 20, 1906.

Application filed January 9, 1905. Serial No. 240,183.

*To all whom it may concern:*

Be it known that I, EDWARD R. SHAW, a citizen of the United States, residing at Lynn, county of Essex, State of Massachusetts, have invented a certain new and useful Improvement in Implements for Cutting Leather and the Like, of which the following is a specification, reference being had therein to the accompanying drawings.

Heretofore in the manufacture of shoes it has been customary for the cutters to cut out the various parts of a shoe from leather by hand, using patterns and a hand-knife. These patterns are frequently made from strawboard bound with brass and are quite expensive, a full set of these patterns consisting of one for each piece that goes to make up a shoe. As many sets of these patterns are required as there are sizes of shoes to be made. These patterns take up considerable room for storage, and much time is wasted by the cutters in obtaining the right patterns from the storeroom. Boys are often employed to find and bring to the cutters the patterns required. Very considerable skill is also required of the cutter when using these patterns in properly manipulating the knife to obtain the best results, since otherwise the piece cut out will not be the exact size and shape required or the edges will be slightly beveled. After the pieces of leather have been cut out by the aid of the pattern and hand-knife it is customary to prick them at certain points with a pricker or small hand-awl to guide the workmen in performing certain subsequent operations in the manufacture of the shoe. This pricking must be done with great precision. It is also convenient that certain of the parts—as, for instance, the vamp—be marked to indicate which are "rights" and which are "lefts." This has previously been accomplished by having the cutter stamp them as they are cut out with the letters "R" and "L," respectively.

My invention has for its object the production of an implement, device, or tool which shall do away with the necessity of different sets of patterns and which shall perform the operations of cutting, pricking, and marking simultaneously and automatically. The pieces cut by this implement are always true and of the exact size required. They are always precisely pricked and correctly marked. A large saving in time is also effected, as the cutting, pricking, and marking are all done at one operation, and this operation is performed in less time than has heretofore been required for the performance of any one of these operations.

My device may be used in cutting leather or similar material, it being especially adapted for the cutting of the various parts of boots and shoes, pocket-books, bags, and gloves, as well as in the manufacture of a large number of other articles of a like nature. I have not as yet employed my invention in the cutting of very hard and thick leather—such, for example, as harness and sole leather—but I contemplate its employment for this purpose.

While I have shown in the accompanying drawings my invention as embodied in two forms—one for cutting the quarters and the other for cutting the vamps of boots and shoes—I do not wish to be understood as limiting myself to these particular forms, since I believe my invention to be a pioneer invention, and it is evident that it may be adapted to cut out pieces of almost any shape without departing from the spirit of the invention.

My invention will be readily understood from the following description, in which reference is made to the accompanying drawings, and the novel features thereof are pointed out and clearly defined in the claims at the end of this specification.

Figure 1:
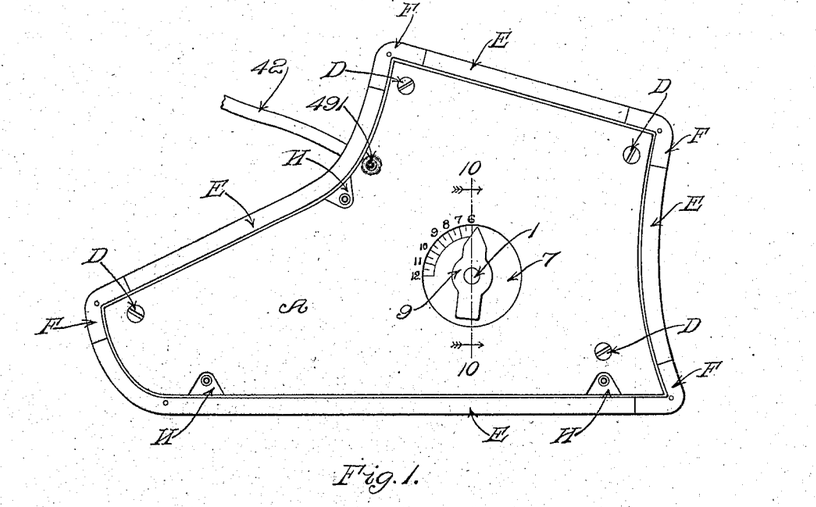
Figure 1 is a top plan view of an implement embodying the invention and suitable for use in cutting the quarters of a shoe.
Figure 2:
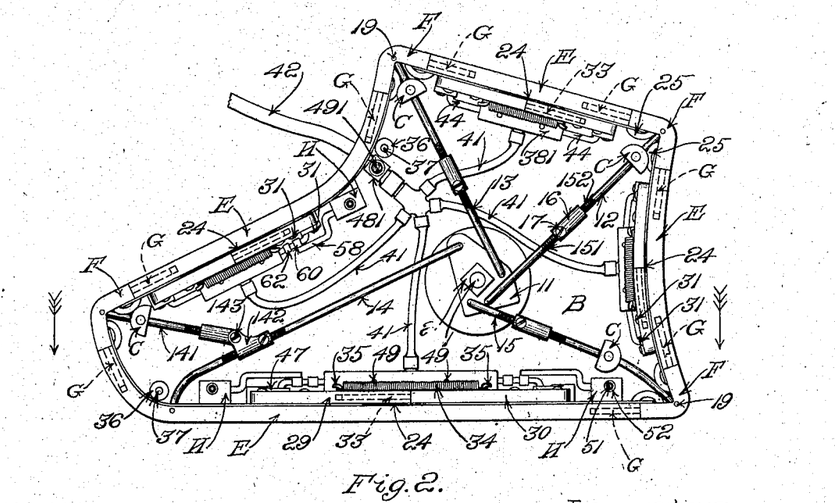
Fig. 2 is a similar view with the upper face-plate removed to show the interior construction.
Figure 3:
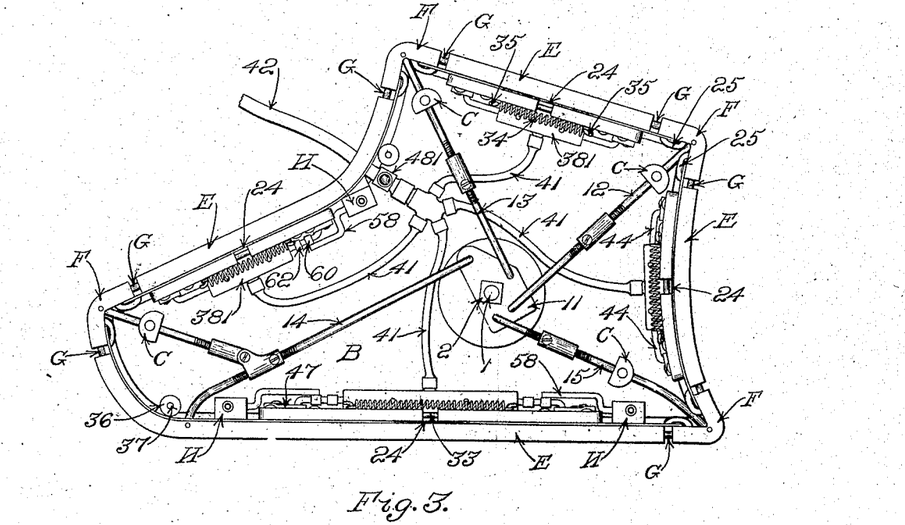
Fig. 3 is the same, but with the edge pieces extended to cut a larger-sized quarter.
Figure 4:
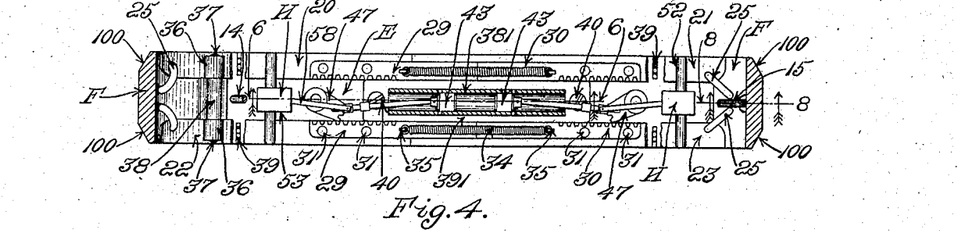
Fig. 4 is a view of the side wall of the device shown in Fig. 2 looking in the direction indicated by the arrows in that figure, certain parts being in section for greater clearness.
Figure 5:
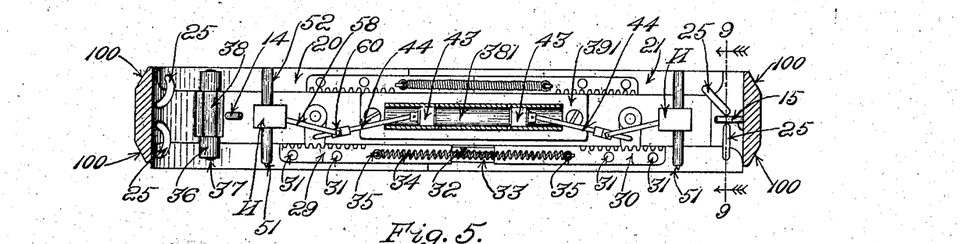
Fig. 5 is the same view with the parts in the cutting position.

Referring to the drawings, and particularly to Figs. 1, 2, and 3, A designates the top face-plate, and B the under or lower face-plate, of an implement embodying my invention and adapted for use in cutting the quarters of shoes. These face-plates are made in the shape required, in this case in the shape of a quarter, and serve to support and inclose the various parts of the mechanism. The two face-plates A and B are kept at the desired distance from each other and are supported by means of the corner or guiding posts C, which are held in place by the screws D, said screws D acting as pivots and allowing the posts C to turn slightly about their longitudinal axes for a purpose to be explained later. Edge pieces E and corner-pieces F surround the face-plates A and B, following their edge contours and forming, with the face-plates A and B, a sort of box. In this specification I sometimes use the term "edge piece" to include both the edge pieces E and corner-pieces F, it being clear from the context whether the term is used in its general or particular sense. The inside surface of the edge and corner pieces is the exact pattern of the piece to be cut. Each corner-piece F is attached to the adjacent edge pieces E by means of sliding pins G, fast in the corner-piece F and sliding in corresponding holes in the adjacent edge pieces E. In practice I have used two pins G of circular cross-section at each of these joints; but other forms may be used—such, for instance, as a single slide of rectangular cross-section slightly smaller than the cross-section of the edge piece E or the corner-piece G. The top and bottom outside edges of the edge and corner pieces are beveled, as shown at 100, as seen in Figs. 4 and 5, to permit the workman to see well under the edges of the tool or implement when placing it near scars or imperfections in laying out the work.

The size indicated by the inside edge of the edge and the corner-pieces E and F when in the position shown in Figs. 1 and 2 is that of the smallest piece which can be cut with particular implement or tool. The various larger sizes are produced by moving the edge and corner pieces outwardly in unison and through a uniform distance. This movement is produced and controlled by the following mechanism:

At the center of the tool and suitably supported in holes in the two face-plates A and B is a spindle 1, (see Figs. 1, 2, 3, and 10,) formed with a squared portion 2 and cylindrical ends 3 and 4, screw-threaded for a portion of their length, as shown at 5 and 6. The face-plates A and B are formed with circular depressions 7 and 8, within which are received the pointers or indicators 9 and 10, fast to the ends of the spindle 1. It is to be noted that the indicators 9 and 10 are flush with or slightly below the surface of the face-plates, so that one face-plate may lie directly upon the surface of the material to be cut no matter which side up the implement or tool is being used. It will also be seen that none of the parts project above the level of the face-plate. The exterior surfaces of the face-plates A and B about the depressions 7 and 8 are graduated, as shown in Fig. 1, with numbers indicating the sizes of the parts of the shoe or other article to be cut out by the use of the tool. The indicators 9 and 10 also form a convenient handle or thumb-piece by means of which the spindle 1 and its connected parts may be rotated by the workman when desired.

Figure 14:
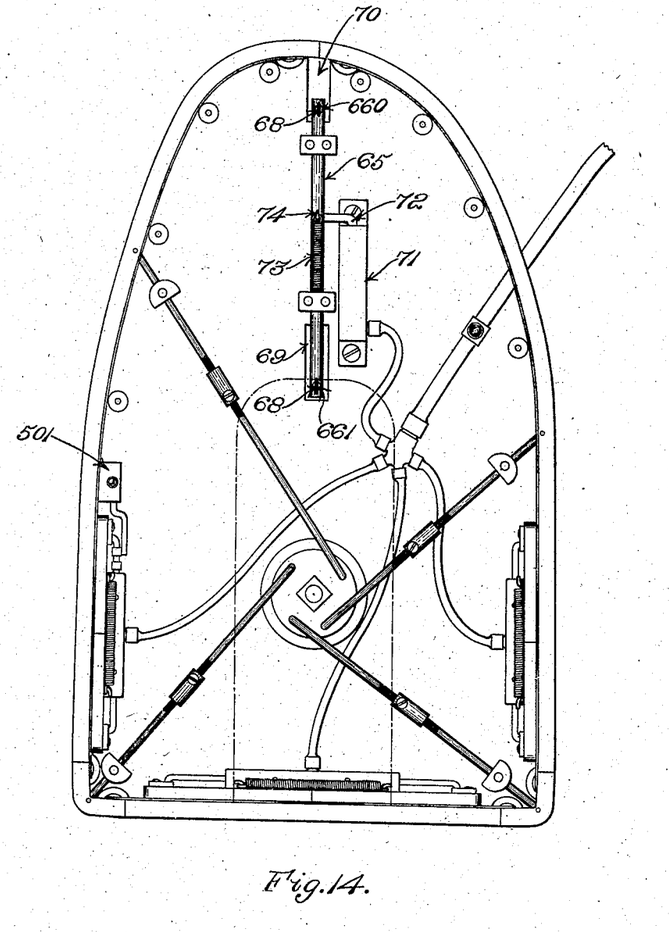
Fig. 14 is a view showing my invention as arranged for cutting vamps for shoes.

A part 11, which for convenience I have termed a "crank-piece," is fast to the squared portion of the spindle 1. This crank-piece 11 may be of different shapes, according to the particular shape of the tool in which it is employed. In the case of the quarter-cutter, as shown in Figs. 2 and 3, it is of irregular shape, while in the case of the vamp-cutter (see Fig. 14) it may be conveniently made of circular shape. This crank-piece 11 is provided at suitable distances from its center with holes, in which are inserted the bent ends of the connecting-rods 12, 13, 14, and 15, which run to the corner-pieces F. The connecting-rods 12, 13, 14, and 15 are supported and guided in their movement by holes in the corner or guiding posts C, these posts being pivoted, as previously described, to enable them to accommodate themselves to the varying positions of the connecting-rods. For convenience I provide each of the connecting-rods 12, 13, 14, and 15 with adjusting means by breaking the connecting-rods in their centers and providing the adjacent ends with right and left screw-threads, respectively, as shown at 151 and 152. These screw-threaded ends are received within a correspondingly-threaded sleeve 16, by the rotation of which the connecting-rod may be lengthened or shortened, as desired. A set-screw 17 is also provided to prevent the parts working loose.

Figure 8:
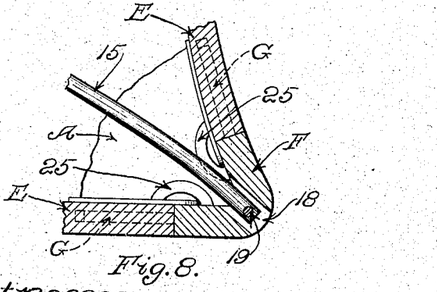
Fig. 8 is a section on line 8 8, Fig. 4, also enlarged.

The outer ends of the connecting-rods are received within slots in the corner-pieces to which the connecting-rods are pivoted. This arrangement is clearly shown in Fig. 8, which is a detail of the lower right-hand corner of the device shown in Figs. 1, 2, and 3. In this figure the slot is designated 18, the vertical pivot 19 being seen in cross-section. It is not necessary that this slot or recess 18 be extended through the wall of the corner-piece F, as shown in Fig. 8, it only being necessary that the end of the connecting-rod 15 be given sufficient room to play.

When the workman desires to cut out a part of any given size within the range of the implement, he turns the indicator 9 to the point on the dial corresponding with the size desired, thus rotating somewhat the crank-piece 11 and moving the various connecting-rods 12, 13, 14, and 15. The connecting-rods in their movement carry outwardly the corner-pieces F, as shown in Fig. 3. The edge pieces E are also carried outwardly, the slides G serving to maintain the parts in the same relative positions. It is therefore to be seen that by properly proportioning the parts, and especially the radial distances from the pivot 1 to the points at which the various connecting-rods 12, 13, 14, and 15 are attached to the crank-piece 11, a device is produced in which the proper shape is maintained in each of the sizes for which it is used. It is also to be noted that at the toe end of the quarter-cutter a modification of the connecting-rod mechanism is employed on account of the peculiar conditions prevailing there. In this case the connecting-rod 14 is pivoted at its outer end to the edge piece E, while a branch connecting-rod 141 is pivotally connected to the sleeve 142 at 143, its other end passing through the hole in the corner pivotal post C and being attached to the corner-piece F in the usual manner. This arrangement produces substantially the same action of the parts and is to be preferred for certain structural reasons.

So far there has been described in this specification the means by which the device is adapted for use in producing the different sizes of parts required to be cut. This operation may be termed "grading" for convenience. I will now describe the means by which the leather or other substance is cut out, the device having been adjusted to the required size.

The parts which perform the cutting operation are supported upon the edge and corner pieces E and F and are moved outwardly with them during the grading operation, thus automatically adjusting them for each size. The cutting instrumentalities consist in thin flexible knives which follow the inner surface or contour of the edge and corner pieces E and F and are given an endwise and downward movement. The knives are made of material, such as spring-steel, capable of receiving and retaining a keen edge, while at the same time possessing a high degree of flexibility. The knives are arranged in two sets, one for the top, which cuts the "lefts," and another for the bottom, which cuts the "rights," it being possible to cut either rights or lefts by simply turning the implement upside down. Two knives are provided for each set on each side of the implement.

Figure 7:
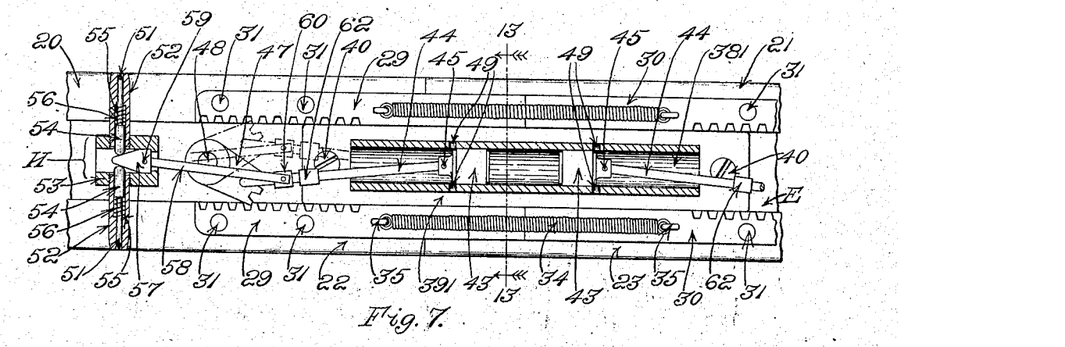
Fig. 7 is a view, on an enlarged scale, of a portion of Fig. 4 with the pricker in section.
Figure 11:
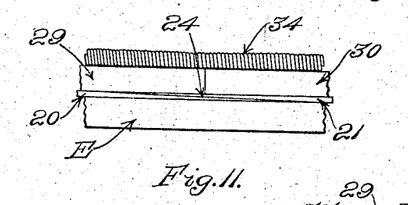
Fig. 11 is an enlarged view showing the overlapping of the knives.

Referring to Figs. 4, 5, and 7, the knives in the upper set are designated 20 and 21 and those in the lower set 22 and 23. The two knives in each set overlap each other, as seen at 24 in Figs. 3 and 11, and are thinned or beveled for this purpose toward their inner ends.

Figure 6:
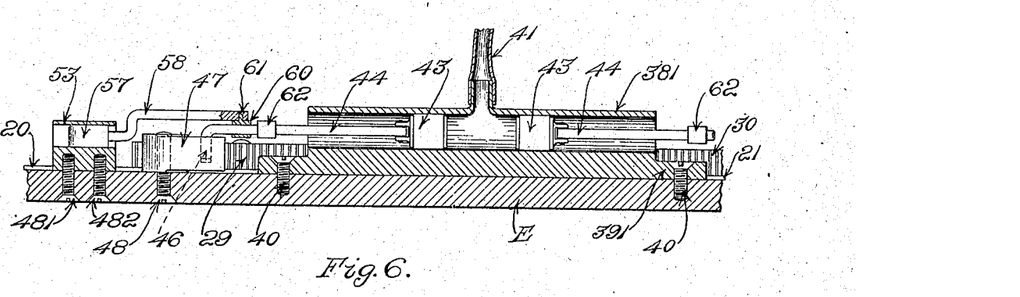
Fig. 6 is a section, somewhat enlarged, on line 6 6, Fig. 4.
Figure 9:
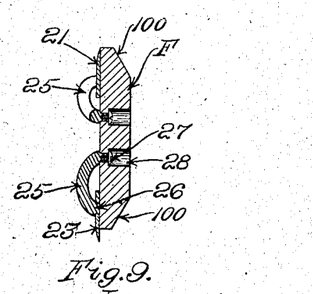
Fig. 9 is a section on line 9 9, Fig. 5, also enlarged.
Figure 10:
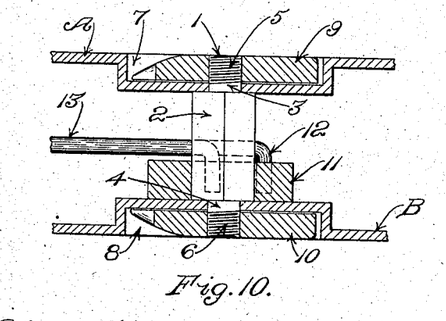
Fig. 10 is a section on line 10 10, Fig. 1, also enlarged.
Figure 12:
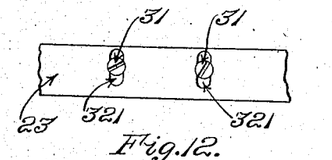
Fig. 12 is an enlarged view showing the means provided for the adjustment of the knives.

The knives are supported at their outer ends by swinging links 25, one end of which has a portion 26, (see Fig. 9,) turned to a slightly-smaller diameter and inserted in a corresponding hole in the knife, the shoulder thus formed resting against the blade of the knife. The other end of the link 25 is correspondingly turned down to form a shoulder and the end drilled and tapped to receive a screw 27, the head of which is received within the hole 28, drilled from the outside of the corner-piece F. This arrangement of the swinging links 25 makes it possible to take out the knives when necessary to be sharpened by loosening the screw 27, when the other end of the swinging link 25 can be disengaged from the holes in the knife-blade. The inner ends of the knives are screwed or otherwise suitably attached to racks 29 and 30 by screws 31. For the sake of adjustment to take up the wear of the knives I provide slots 321 in the knives to receive the heads of the screws 31, (see Fig. 12,) the heads of the screws being flush with the surface of the blade. The ends of the racks 29 and 30 butt against each other, as shown in Fig. 4, where the knives and connected parts are shown in the position assumed before the cutting operation begins. To guide the racks 29 and 30 during the endwise movement of the blades in the cutting operation, guides 32 and 33 (see Figs. 5 and 13) are provided, sliding in corresponding holes in the racks 29 and 30. A spring 34, attached to hooks or projections 35 on the racks, insures the return of the knives and attached racks to their original position after the cutting operation. The flexible knives are guided at the curves in the edge and corner pieces E and F and elsewhere, if desired, by antifriction-bearings. In practice I employ rollers 36, mounted on axles 37 and carried in lugs 38 on the edge pieces E at the corners. I also place ball-bearings 39 in the edge pieces, as seen in Fig. 4, in which the knives 22 and 23 are broken away to show the bearings. These bearings serve to minimize the friction on the knives. Bearings and rollers similar to those shown in the drawings may be used in connection with the knives wherever it is found necessary or desirable to do so, as where the sides are more or less sharply curved. The knives on each edge of my implement or tool are arranged to be actuated by a single engine or motor, which is driven by compressed air, steam, or other suitable fluid under pressure. The motor is arranged so that it will act upon whichever set of knife-blades is in the lowermost or operative position. The engine or motor consists in a cylinder 381, cast in one piece with the bed 391 and secured to the edge piece E by means of screws 40. Compressed air is admitted to the middle of the cylinder 381 by the pipe 41, which connects with the main pipe 42. Two pistons 43 are located in the cylinder 381. Each of the pistons 43 operates upon an engine connecting-rod 44, which is attached to the piston by a pin 45. The other end of the engine connecting-rod is bent as shown at 46 (see Fig. 6) and is inserted in a hole in a gear-sector 47, carried on a screw-stud 48 in the edge piece E. The cylinder 381 is provided with exhaust-ports 49, which permit the escape of the charge of compressed air from the cylinder when the pistons have passed them. The gear-sectors 47 engage the racks 29 and 30 when the compressed air is admitted to the cylinder and move the racks and attached knives endwise and downward against the tension of the spring 33 until the position illustrated by the lower knife in Fig. 5 is reached. During this movement the ends of the knives are guided and supported by the swinging links 25 and the centers by the guides 32. The swinging links 25 give to the knives a drawing action, which facilitates the cutting, particularly of tender stock. The weight of the gear-sector 47 and the engine connecting-rod 44 is sufficient to cause the sector to assume the position shown in dotted line in Fig. 7 and engage the other rack when the tool is turned other side up to cut the reverse piece. By this arrangement both sets of knives are operated alternately by the same engine, thus simplifying the construction and allowing one set of knives to remain at rest while the others are in operation.

As seen from Figs. 2 and 3, each edge of the tool is provided with an engine to operate the knives located at that edge, and all the engines are supplied with compressed air from the main pipe 42 through the various branch pipes 41, the supply to all being controlled by a single valve 481 in the main pipe. The control-valve 481 is operated by the workman by means of a button 491 on the top and bottom sides of the implement. The workman is able to give the tool or implement the desired size by a single movement of the indicator 9 and to cut out the part by pressing the button 491 on whichever side is uppermost. The prickers or prick-markers consist in two oppositely-disposed pointed pins 51, (see Fig. 7,) supported in tubular guides 52, which are screwed into the cam-guide 53, fastened to the edge piece E by the screws 481 482. The pins 51 are provided with enlarged heads 54, which move in a corresponding bore in the tubular guides 52. Between the head 54 and the shoulder 55, formed in the tubular guide 52, a spiral spring 56 is placed which tends to hold the pin in the position shown in Fig. 7. A double-faced cam or wedge 57 is located in the cam-guide 53 and engages the heads of the pins 51 and forces them in opposite directions into the leather at the required points. The cam 57 is actuated by a connecting-rod 58, attached to the cam by a pin 59. The connecting-rod 58 is attached at its other end to a sliding sleeve 60 by a pin 61, the said sliding sleeve being so located that it will be engaged by a collar 62, fast on the engine connecting-rod 44 toward the end of its stroke. These prickers or prick-markers are located wherever required. In Fig. 3 I have shown three and have designated them by the character H.

Figure 13:
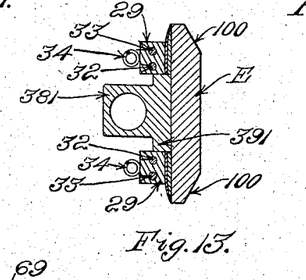
Fig. 13 is a section of the rack on line 13 13, Fig. 7.
Figure 15:
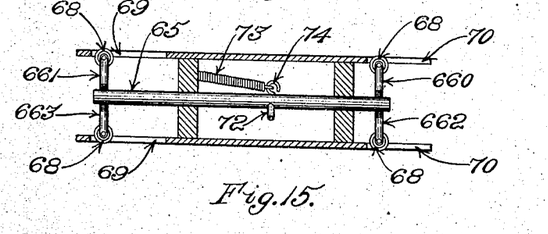
Fig. 15 is a detail of the vamp-center marker.

Referring now to Figs. 13 and 15, these show my invention as embodied in an implement or tool for producing vamps for shoes. The apparatus for "grading" and cutting is similar to that previously described in connection with the quarter-cutter, only such changes being made as are necessary to adapt the mechanism to the peculiar shape of a vamp. Since it is difficult to tell by inspection whether a vamp is a right or a left, I find it convenient to provide a device 501, (see Fig. 14,) which I call a "right and left marker," similar to the prick-markers just described, except that the pin is provided with a die for stamping the letter "L" or "R," as the case may be, in place of the usual pin-point. It is also convenient that the vamp be creased or marked along the center line to indicate the middle to the laster or other subsequent workman. To accomplish this, I provide a sliding bar 65, having cross-bars 660 and 661, 662, and 663, at the ends of which are pivoted marking-wheels 68. These marking-wheels have sharp peripheries adapted to make a distinct mark or crease in the leather without cutting it. The ends of the cross-bars 660, 661, 662, and 663 are screw-threaded, as shown, thus providing a convenient adjustment by means of which to compensate for the wear of the marking-wheels. Two slots 69 and 70 are cut in the face-plate to allow the marking-wheels access to the leather. The bar 65 is actuated by an engine 71, similar to those already described, but provided with only one piston. The piston-rod 72 is bent, as shown, and attached to the sliding bar. The sliding bar is retracted to its normal position by a spring 73, attached to a hook 74 on the sliding bar 75.

From the foregoing description it will be clear that my implement or tool enables the workman to use a single pattern for all the sizes required, that this pattern may be instantly adjusted to the size required, and that when so adjusted it is possible for the workman to cut out the piece, prick-mark it, and mark it with the letters "R" or "L" by a single movement of the valve controlling the supply of compressed air to the engines or motors, thus doing away with the large numbers of patterns heretofore required and making a considerable saving in time.

What I claim is—

1. An implement of the character described, comprising a bed-plate, movable edge pieces surrounding the said bed-plate, and actuating means for the said movable edge pieces.

2. An implement of the character described, comprising a bed-plate of a shape substantially like that of the piece of leather to be cut, movable edge pieces surrounding the said bed-plate and actuating means therefor.

3. An implement of the character described, comprising a bed-plate of a shape substantially like that of the pieces of leather to be cut, movable edge pieces and corner-pieces surrounding the said bed-plate and actuating means therefor.

4. An implement of the character described comprising a bed-plate side and corner pieces of proper contour outside of the said bed-plate and movable toward and away from it to give the pattern the desired size, and actuating means operating upon the said corner-pieces to move them to their various positions.

5. An implement of the character described comprising a bed-plate, side and corner pieces of proper contour outside of the said bed-plate and movable toward or away from it to give the pattern the desired size, guiding means connecting the said side and corner pieces, and actuating means for the said side and corner pieces.

6. In an implement of the character described, the combination with a bed-plate, edge and corner pieces of proper contour surrounding the said bed-plate and movable in relation thereto, of actuating means for the said edge and corner pieces comprising a crank-piece, connecting-rods pivotally connected at one end to the said edge and corner pieces, and at the other end to the said crank-piece.

7. In an implement of the character described, the combination with a bed-plate, edge and corner pieces of proper contour surrounding the said bed-plate and movable in relation thereto, of actuating means for the said edge and corner pieces comprising a crank-piece, connecting-rods pivotally connected at one end to the said edge and corner pieces, and at the other end to the said crank-piece, and adjusting means for the said connecting-rods.

8. An implement of the character described comprising a bed-plate, edge pieces of proper contour, connecting-rods for the said edge pieces, guiding-posts pivotally mounted on the said bed-plate for the said connecting-rods, and actuating means for the said connecting-rods.

9. An implement of the character described comprising a bed-plate, edge pieces of proper contour, connecting-rods for the said edge pieces, guiding-posts pivotally mounted on the said bed-plate and provided with holes in which the said connecting-rods slide, and actuating means for the said connecting-rods.

10. An implement of the character described comprising a bed-plate, edge pieces of proper contour, connecting-rods for the said edge pieces, guiding means for the said connecting-rods, and a crank-piece actuating the said connecting-rods.

11. An implement of the character described comprising a bed-plate, edge pieces of proper contour, connecting-rods hinged to the said edge pieces, guiding means for the said connecting-rods, and a crank-piece pivotally mounted on the said bed-plate and actuating the said connecting-rods.

12. An implement of the character described comprising a bed-plate, edge pieces of proper contour, connecting-rods hinged to the said edge pieces, a crank-piece actuating the said connecting-rods, and a size-indicating finger, moving in unison with the said crank-piece.

13. An implement of the character described comprising a bed-plate, edge pieces of proper contour, connecting-rods hinged to the said edge pieces, a crank-piece actuating the said connecting-rods, a pivot therefor, and a size-indicating finger fast on the said pivot and movable therewith.

14. An implement of the character described comprising a bed-plate, edge pieces of proper contour, connecting-rods hinged to the said edge pieces, adjusting means for adjusting the length of the said connecting-rods, and a crank-piece actuating the said connecting-rods.

15. An implement of the character described comprising an adjustable pattern, and cutting mechanism movable with the said pattern for adjustment therewith, and independently of the said pattern to perform the cutting operation.

16. An implement of the character described comprising a pattern, and flexible knives following the edge contour of the said pattern and movable independently of the said pattern to perform the cutting operation.

17. An implement of the character described comprising an adjustable pattern and flexible knives following the edge contour of the said pattern and movable independently of the said pattern to perform the cutting operation.

18. An implement of the character described comprising a bed-plate movable edge pieces of proper contour movable toward or away from the said bed-plate to form a pattern of the desired size and flexible knives following the contour of the said movable edge pieces and movable independently of the said pattern to perform the cutting operation.

19. An implement of the character described comprising a bed-plate movable edge pieces of proper contour movable toward or away from the said bed-plate to form a pattern of the desired size and flexible knives following the contour of the said movable edge pieces and movable independently of the said pattern to perform the cutting operation, said flexible knives being mounted on the said edge pieces and movable therewith.

20. An implement of the character described, comprising a bed-plate, edge pieces of proper contour movable toward or away from the said bed-plate to form a pattern of the desired size, and flexible knives following the contour of the said edge pieces, and arranged in pairs for the upper and lower faces of the implement.

21. An implement of the character described, comprising a bed-plate, edge pieces of proper contour outside of the said bed-plate and movable toward or away from the said bed-plate to form a pattern of the desired size and flexible knives following the contour of the said edge pieces and arranged in pairs each pair comprising two overlapping knives.

22. The cutting mechanism for an implement of the character described comprising a pair of flexible knives, guiding and supporting means for the said knives, and operating means imparting an endwise movement to the said knives during the cutting operation.

23. The cutting mechanism for an implement of the character described comprising a pair of flexible knives, swinging links supporting said knives, racks fast to each of said knives, and a sliding connection between the said racks.

24. The cutting mechanism for an implement of the character described comprising a pair of flexible knives, swinging links supporting said knives, racks fast to each of said knives, a sliding connection between the said racks, and operating means for said knives imparting an endwise movement thereto.

25. The cutting mechanism for an implement of the character described comprising a pair of flexible knives, guiding and supporting means for the said knives, a rack fast to each of said knives, and a sector of a gear engaging the said rack and operating means for the said sector.

26. The cutting mechanism for an implement of the character described comprising a pair of flexible knives, guiding and supporting means for the said knives, a rack fast to each of said knives, a sector of a gear engaging the said rack and a fluid-pressure-operated cylinder piston-rod and intermediate connections operating the said sector.

27. The cutting mechanism for a reversible implement of the character described, comprising two pairs of knives, one for rights and one for lefts, racks for each of the said knives a sector of a gear pivoted between the pairs of racks, and caused by gravity to engage the lower rack whenever the implement is turned over and operating means for the said sector.

28. The cutting mechanism for an implement of the character described, comprising a pair of flexible knives, guiding and supporting means for the said knives, operating means imparting endwise movement to the said knives in one direction during the cutting operation, and retracting means as a spring for the said knives.

29. The cutting implement comprising cutting mechanism operated by a fluid-pressure-actuated piston and cylinder, a cutter connecting-rod provided with a shoulder, a slidable connection on the said connecting-rod and engaged by the said shoulder, a pricker-pin, a cam-surface engaging the head of said pricker-pin, and a connecting-rod between the said slidable connection and the said cam-surface whereby the said cam-surface is moved during a portion only of the stroke of the cutter connecting-rod.

30. The cutting implement comprising flexible edge knives prickers, fluid-pressure-actuated operating means for the said edge knives, and prickers, and a control-valve controlling the supply of fluid-pressure to the operating means for the edge knives and prickers.

31. The reversible cutting implement comprising a pair of bed-plates, edge pieces of proper contour movable toward or away from the said bed-plates to form a pattern of the desired size, and flexible knives following the edge contour of the said pattern, arranged in sets on the top and bottom sides of the said implement.

32. The implement of the character described comprising an adjustable pattern, flexible knives carried on the edge of said pattern and antifriction-bearings for the said flexible knives.

33. An implement of the character described, comprising an adjustable pattern, flexible knives following the edge contour of the said pattern, pricking mechanism, and center-marking mechanism.

34. An implement of the character described, comprising a pattern, flexible knives, following the edge contour of the said pattern, guiding and supporting means, and fluid-pressure-operated actuating means for the said knives.

In testimony whereof I affix my signature in presence of two witnesses.

EDWARD R. SHAW.

Witnesses:
GEORGE P. DIKE,
WILLIAM A. COPELAND.